US008943483B2

(12) United States Patent
Balasubramanian et al.

(10) Patent No.: US 8,943,483 B2
(45) Date of Patent: Jan. 27, 2015

(54) APPLICATION PROGRAMMING INTERFACE NAMING USING COLLABORATIVE SERVICES

(75) Inventors: Swaminathan Balasubramanian, Troy, MI (US); Andrew R. Jones, Round Rock, TX (US); Brian M. O'Connell, Research Triangle Park, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 984 days.

(21) Appl. No.: 12/944,534

(22) Filed: Nov. 11, 2010

(65) Prior Publication Data
US 2012/0124562 A1 May 17, 2012

(51) Int. Cl.
G06F 9/45 (2006.01)
G06F 9/44 (2006.01)

(52) U.S. Cl.
CPC . *G06F 8/20* (2013.01); *G06F 8/434* (2013.01)
USPC .......................................... 717/140

(58) Field of Classification Search
CPC combination set(s) only.
See application file for complete search history.

(56) References Cited

U.S. PATENT DOCUMENTS

| | | | | |
|---|---|---|---|---|
| 5,097,533 | A * | 3/1992 | Burger et al. | 719/328 |
| 5,689,711 | A * | 11/1997 | Bardasz et al. | 717/105 |
| 6,026,238 | A * | 2/2000 | Bond et al. | 717/141 |
| 6,072,952 | A * | 6/2000 | Janakiraman | 717/155 |
| 6,253,257 | B1 * | 6/2001 | Dundon | 719/331 |
| 6,311,226 | B1 | 10/2001 | Rosen et al. | |
| 6,336,105 | B1 | 1/2002 | Conklin et al. | |
| 6,434,742 | B1 * | 8/2002 | Koepele, Jr. | 717/140 |
| 6,836,884 | B1 * | 12/2004 | Evans et al. | 717/140 |
| 7,194,442 | B1 | 3/2007 | Flanagan et al. | |
| 2003/0005406 | A1 * | 1/2003 | Lin et al. | 717/102 |
| 2003/0051067 | A1 | 3/2003 | Johnson | |
| 2004/0083465 | A1 * | 4/2004 | Zhang et al. | 717/143 |
| 2005/0005260 | A1 | 1/2005 | Antonov et al. | |
| 2005/0188356 | A1 | 8/2005 | Lwo | |
| 2005/0193373 | A1 | 9/2005 | Wannamaker et al. | |
| 2005/0273789 | A1 | 12/2005 | Miller et al. | |
| 2006/0036570 | A1 * | 2/2006 | Schaefer et al. | 707/1 |
| 2008/0022266 | A1 | 1/2008 | Hudson | |
| 2009/0106731 | A1 * | 4/2009 | Coulthard et al. | 717/101 |
| 2009/0178031 | A1 * | 7/2009 | Zhao | 717/143 |
| 2009/0328028 | A1 * | 12/2009 | O'Rourke et al. | 717/173 |
| 2011/0289483 | A1 * | 11/2011 | Williams et al. | 717/126 |

OTHER PUBLICATIONS

Bashar Gharaibeh, Tien N. Nguyen, and J. Morris Chang. "Coping with API Evolution for Running, Mission-Critical Applications Using Virtual Execution Environment". Seventh International Conference on Quality Software, 2007. IEEE. Oct. 11-12, 2007, pp. 171-180.*

(Continued)

*Primary Examiner* — Lewis A Bullock, Jr.
*Assistant Examiner* — Keith C Yuen
(74) *Attorney, Agent, or Firm* — Yee & Associates, P.C.; Lisa J. Ulrich (57) ABSTRACT

A method, computer system, and computer program product for improving application programming interface naming. An alternate name is received for a target application programming interface feature from a consumer developer. In addition, an indirection to the application programming interface feature is generated based on the alternate name. Then, the indirection to the application programming interface feature is transmitted to an indirections repository.

14 Claims, 7 Drawing Sheets

(56) References Cited

OTHER PUBLICATIONS

Michael Hicks, Jonathan T. Moore, and Scott Nettles. "Dynamic Software Updating". Proceedings of the ACM SIGPLAN 2001 conference on Programming language design and implementation. pp. 13-23. Jun. 2001. Snowbird, Utah, USA.*

Robbes et al., "Mining a Change-Based Software Repository", International Conference on Software Engineering, Proceedings of the Fourth International Workshop on Mining Software Repositories, IEEE Computer Society Washington, DC, USA, 2007, pp. 1-8.

Henkel et al., "CatchUp! Capturing and Replaying Refactorings to Support API Evolution", International Conference on Software Engineering, Proceedings of the 27th international conference on Software engineering, ACM New York, NY, USA, 2005, pp. 274-283.

* cited by examiner

APPLICATION PROGRAMMING INTERFACE NAMING USING COLLABORATIVE SERVICES

BACKGROUND

1. Field

The disclosure relates to a method, computer system, and computer program product for improving application programming interface naming using collaborative services.

2. Description of the Related Art

An application programming interface (API) is an interface implemented by a software program, which enables the software program to interact with other software programs. An application programming interface is implemented by a software program in order to provide access to the program's services. An application programming interface is an abstraction that describes an interface for the interaction with a set of features used by components of a software program. An application programming interface may include a set of methods, classes, procedures, and/or protocols that allows a service provider software program to service requests from consumer software programs. In some instances, application programming interfaces are public interfaces to services offered by a provider software program. In other instances, application programming interfaces implement and encapsulate solutions to a specific class of problems. While most application programming interfaces are language dependent in that they are available only in a particular programming language, some application programming interfaces are programming language neutral. In such cases, the consumer software program may invoke the application programming interface in a programming language that is different from the programming language used to create the application programming interface.

The various features offered by an application programming interface can be described in the names, hereinafter referred to as feature names, of methods, classes, and other such public interfaces of the application programming interface. These feature names and any other associated descriptions allow developers of consumer software programs to determine the functionality provided by the application programming interface.

SUMMARY

According to one embodiment of the present invention, a method for improving application programming interface naming is provided. A computer receives an alternate name for a target application programming interface feature from a consumer developer. In addition, the computer generates an indirection to the application programming interface feature based on the alternate name. Then, the computer transmits the indirection to the application programming interface feature to an indirections repository.

According to another embodiment of the present invention, a computer system for improving application programming interface naming is provided. The computer system includes one or more processors, one or more computer-readable memories, and one or more computer-readable, tangible storage devices. At least one of the one or more storage devices stores program instructions, which when executed by at least one of the one or more processors via at least one of the one or more memories receive an alternate name for a target application programming interface feature, generate an indirection to the application programming interface feature based on the alternate name, and transmit the indirection to the application programming interface feature to an indirections repository.

According to a further embodiment of the present invention, a computer program product for improving application programming interface naming is provided. The computer program product includes one or more computer-readable, tangible storage devices and program instructions stored on at least one of the one or more storage devices to receive an alternate name for a target application programming interface feature, generate an indirection to the application programming interface feature based on the alternate name, and transmit the indirection to the application programming interface feature to an indirections repository.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable storage device(s) having computer-readable program code embodied thereon.

Any combination of one or more computer-readable storage device(s) may be utilized. A computer-readable storage device may be, for example, but not limited to, an electronic, magnetic, optical, or semiconductor system, apparatus, or device, or any suitable combination of the foregoing. More specific examples (a non-exhaustive list) of the computer-readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage device may be any tangible device that can store a program for use by or in connection with an instruction execution system, apparatus, or device. The term "computer-readable storage device" does not mean a signal propagation media such as a copper transmission cable, an optical transmission fiber or a wireless transmission media.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage device that can direct a computer, other programmable data processing apparatus, or other devices to function in a particular manner, such that the instructions stored in the computer-readable medium storage device produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
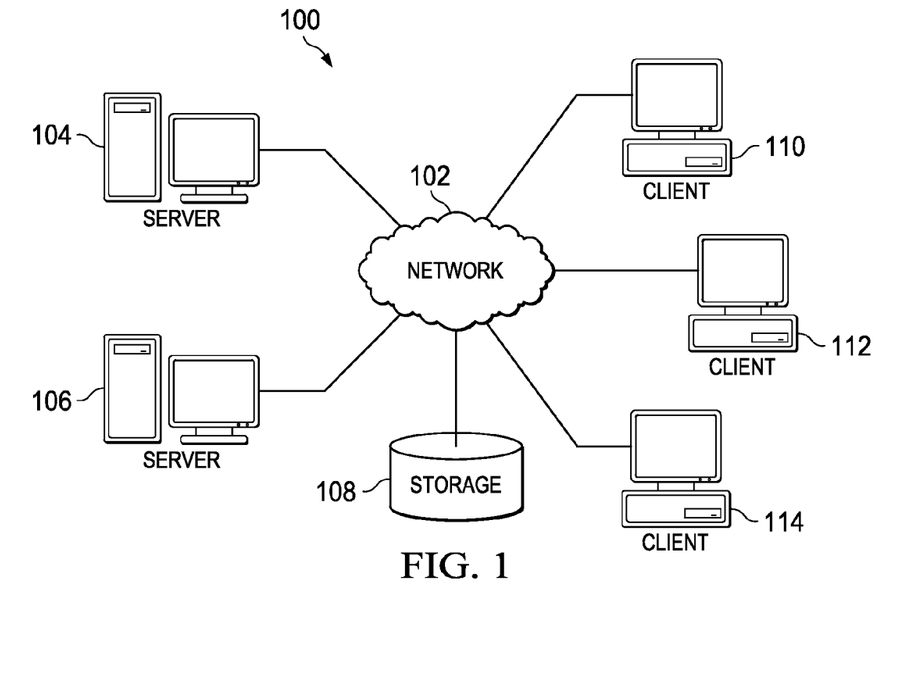
FIG. 1 is a pictorial representation of a network of data processing systems in which illustrative embodiments may be implemented.
Figure 2:
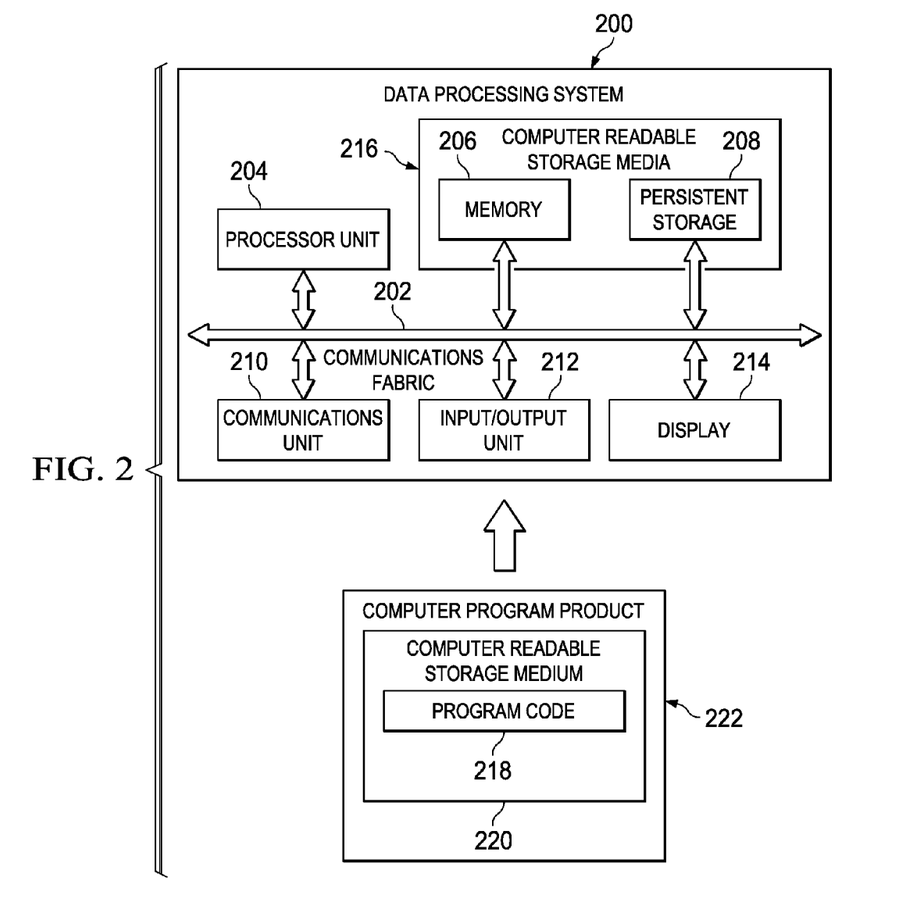
FIG. 2 is a diagram of a data processing system in which illustrative embodiments may be implemented.
Figure 3:
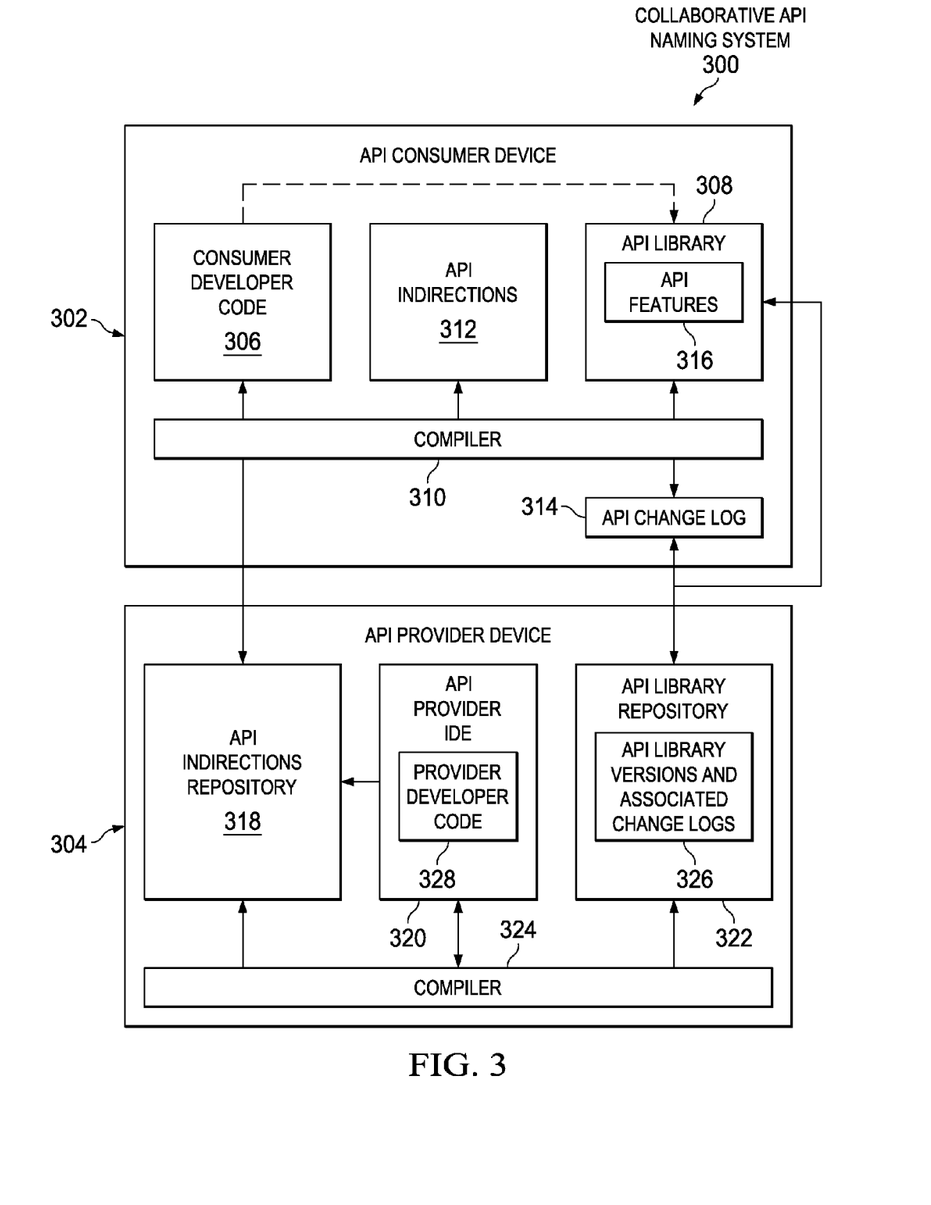
FIG. 3 is a diagram of a collaborative application programming interface naming system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 may, for example, provide a collaborative application programming interface naming environment between provider developers and consumer developers of application programming interfaces. Network data processing system 100 contains network 102, which is the medium used to provide communications links between the computers and the other various devices connected together within network data processing system 100. Network 102 may include connections, such as wire, wireless communication links, or fiber optic cables.

In the depicted example, server 104 and server 106 connect to network 102, along with storage unit 108. Servers 104 and/or 106 may, for example, be a server device that provides application programming interfaces to consumer client devices.

Storage unit 108 is a network storage device capable of storing data in a structured or unstructured format. Further, storage unit 108 may represent a plurality of storage units connected to network 102. Furthermore, storage unit 108 may, for example, store one or more application programming interface library versions that bundle features of one or more application programming interfaces. Moreover, storage unit 108 may also store indirections to alternate names for application programming interfaces. An indirection is a reference or pointer to another name or value for the same object. For example, illustrative embodiments use the indirection to point from an alternate application programming interface feature name to the original provider application programming interface feature name for the same target feature.

Clients 110, 112, and 114 also connect to network 102. Client computers 110, 112, and 114 may, for example, be personal computers or network computers. In the depicted example, server computer 104 and/or server computer 106 provide information, such as boot files, operating system images, and applications to client computers 110, 112, and 114. In addition, client computers 110, 112, and 114 may be consumer devices that utilize application programming interface features provided by server computer 104 and/or server computer 106. Client computers 110, 112, and 114 are clients to server computer 104 and/or server computer 106 in this example.

Further, client computers 110, 112, and 114 may negotiate and collaborate on application programming interface feature naming with server computer 104 and/or server computer 106 during initial construction of application programming interfaces. Such negotiation and collaboration may be accomplished via a collaborative application programming naming service that may, for example, be implemented as a Web service. Furthermore, application programming interface consumer developers using client computers 110, 112, and 114 may generate and provide alternate application programming interface feature names to previously generated names provided by an application programming interface provider developers. Moreover, network data processing system 100 may include additional server computers, client computers, and other devices not shown.

Program code located in network data processing system 100 may be stored on a computer readable storage medium and downloaded to a data processing system or other device for use. For example, program code may be stored on a computer readable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 or client 110 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of computer readable storage media 216. Memory 206, in these examples, may, for example, be a random access memory, or any other suitable volatile or non-volatile computer readable storage medium. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for an operating system, applications, and/or programs may be located in computer readable storage media 216, which are in communication with processor unit 204 through communications fabric 202. In these illustrative examples, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206.

These instructions are referred to as program code, program instructions, or computer readable program instructions that may be read and run by processor unit 204. The program code, in the different embodiments, may be embodied on different physical or computer readable storage media, such as memory 206 or persistent storage 208.

Program code 218 is located in a functional form on computer readable storage media 220 that is selectively removable and may be loaded onto or transferred to data processing system 200 for running by processor unit 204. Program code 218 and computer readable storage medium 220 form computer program product 222.

In some illustrative embodiments, program code 218 may be downloaded over a network to persistent storage 208 from another device or data processing system via communications unit 210 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing aspects of the present invention, it was discovered that feature names chosen by application programming interface provider developers are ambiguous or if the names poorly represent the features they embody, the overall quality of the application programming interface suffers, which reduces the business value of the application programming interface. In addition, poor naming may even cause incorrect usage of an application programming interface feature.

Illustrative embodiments provide a method, computer system, and computer program product for improving application programming interface naming using collaborative services between application programming interface provider developers and consumer developers. Illustrative embodiments improve feature naming within application programming interfaces by using community collaborative services. In a first aspect of illustrative embodiments, application programming interface consumer developers may specify one or more alternate names and formats for a target feature within an application programming interface. Such alternate names are maintained within the consumer developers' integrated development environment. In addition, the application programming interface consumer device automatically generates indirections to target features of the application programming interface based on one or more alternate names for the name originally provided by the application programming interface provider developer.

In a second aspect of illustrative embodiments, such indirections are transmitted to a central repository accessible by both application programming interface feature consumer devices and provider devices. When an application programming interface provider device accesses a target feature, the indirections associated with the target feature are presented by the provider device to the provider developer in a list which, in various exemplary embodiments, can be a rank-ordered list. Further, when the application programming interface provider developer modifies a target feature for which there are associated indirections, the provider device captures and transmits the modifications to application programming interface consumer devices.

A third aspect of illustrative embodiments enables automatic updates to indirections to alternate names for application programming interface features within the consumer integrated development environment based on captured modifications to features made by the application programming interface provider devices. In a fourth aspect of illustrative embodiments, developers of an application programming interface may collaborate and negotiate application programming interface feature names during initial construction of the features. It should be noted that "consumers" and "providers" are not human users, but instead are physical or logical devices.

Thus, illustrative embodiments utilize indirections within the consumer integrated development environment to allow consumer developers to select application programming interface feature names appropriate to the consumer developers' naming conventions and schemes without being tied to provider developer choices of names. In addition, by being able to access consumer developer name choices for application programming interface features, provider developers obtain automatic feedback to their naming choices, thus enabling the provider developers to improve the quality of their application programming interfaces. Further, with automatic indirection updates, illustrative embodiments apply application programming interface feature modifications to the consumer integrated development environment without need for explicit action.

Collaboration between consumer developers and provider developers of application programming interface features provides a framework for better selection of application programming interface feature names. As a result, illustrative embodiments solve the problem of provider developers creating application programming interface feature names that do not accurately describe the application programming interface features the names represent.

With reference now to FIG. 3, a diagram of a collaborative application programming interface naming system is depicted in accordance with an illustrative embodiment. Collaborative application programming interface naming system 300 may, for example, be implemented in a network of data processing systems, such as network data processing system 100 in FIG. 1. Collaborative application programming interface naming system 300 is a system of hardware and software components that application programming interface provider developers and consumer developers utilize to collaborate on the development of application programming interface features and feature names.

Collaborative application programming interface naming system 300 includes application programming interface consumer device 302 and application programming interface provider device 304. Application programming interface consumer device 302 and application programming interface provider device 304 may, for example, be individually or collectively implemented in data processing system 200 in FIG. 2. In addition, it should be noted that application programming interface consumer device 302 and application programming interface provider device 304 may represent a plurality of consumer and provider devices and that the devices may be physical devices, logical devices, or a combination of physical and logical devices.

Application programming interface consumer device 302 includes consumer developer code 306, application programming interface library 308, compiler 310, application programming interface indirections 312, and application programming interface change log 314. Consumer developer code 306, application programming interface library 308, compiler 310, application programming interface indirections 312, and application programming interface change log 314 may represent examples of program code, such as program code 218 in FIG. 2. Consumer developer code 306 is source code that is written by a consumer developer and that utilizes one or more of application programming interface features 316 included in application program interface library 308. Consumer developer code 306 may, for example, include one or more feature names for calling one or more of application programming interface features 316 and may process the corresponding results. Application programming interface features 316 may, for example, include methods, classes, procedures, parameters, and protocols for application programming interfaces.

Application programming interface library 308 may be any standard library for use by a consumer developer. In one exemplary embodiment, application programming interface library 308 can be a Dynamic-linked library (DLL) of shared files. In another exemplary embodiment, application programming interface library 308 can be a collection of application programming interface resources or files.

Compiler 310 compiles consumer developer code 306. Compiler 310 binds application programming interface library 308, either statically or dynamically, into machine processed object code. If compiler 310 generates indirections for one or more feature names within consumer developer code 306 to one or more features in application programming interface features 316, such indirections are maintained in application programming interface indirections 312. The consumer developer uses the indirection to point from a new alternate name for an application programming interface feature, which the new alternate name has been created by the consumer developer, to an original or improper feature name created by an application programming interface provider developer.

While compiling consumer developer code 306, compiler 310 automatically resolves indirections to their target application programming interface features. In addition, when application programming interface library 308 is updated by the consumer developer or consumer device 302, compiler 306 uses application programming interface change log 314 to update application programming interface indirections 312. Application programming interface change log 314 is a record of all changes made to application programming interface features, feature names, and indirections corresponding to the application programming interface features. Application programming interface indirections 312 are locally generated indirections by application programming interface consumer device 302 for alternate application programming interface feature names. In one exemplary embodiment, compiler 310 generates application programming interface indirections 312.

Application programming interface provider device 304 includes application programming interface indirections repository 318, application programming interface provider integrated development environment 320, application programming interface library repository 322, and compiler 324. Application programming interface indirections repository 318, application programming interface provider integrated development environment 320, application programming interface library repository 322, and compiler 324 may represent examples of program code, such as program code 218 in FIG. 2. However, it should be noted that in an alternate illustrative embodiment, application programming interface indirections repository 318 and/or application programming interface library repository 322 may be remotely located from application programming interface provider device 304 in a separate server device, such as storage unit 108 in FIG. 1.

Application programming interface indirections repository 318 stores one or more indirections created by one or more consumer developers for features associated with local consumer application programming interface libraries, such as application programming interface library 308. When an application programming interface provider developer accesses a particular target feature, application programming interface provider integrated development environment 320 accesses application programming interface indirections repository 318 to retrieve all indirections associated with that particular target feature. An integrated development environment, also known as an integrated design environment, is a software application that provides facilities to computer software developers for software development. An integrated development environment typically includes a source code editor, a compiler and/or interpreter, a build automation tool, and a debugger.

After retrieving all indirections associated with a particular target feature, application programming interface provider integrated development environment 320 presents the indirections in a list. In one exemplary embodiment, the list can be a rank-ordered list. The rank-ordered list may, for example, be ordered by frequency of use of the indirections. Alternatively, indirections may be ordered according to some type of rating system. For example, consumer developers may rate different indirections for a particular target feature by applying different numbers of stars to each indirection to indicate preferences.

Application programming interface library repository 322 stores the various versions of an application programming interface library and the associated change logs, such as application programming interface library versions and associated change logs 326, for one or more consumer devices. Consumer devices access application programming interface library repository 322 to obtain newer versions of their respective application programming interface library, such as, for example, application programming interface library 308, and associated change logs, such as, for example, application programming interface change log 314. Compiler 324 compiles provider developer code 328 within application programming interface provider integrated development environment 320 to generate an application programming interface library. Additionally, compiler 324 uses application programming interface indirections repository 318 to generate appropriate change logs when target application programming interface features are modified. Then, compiler 324 stores the generated change log in application programming interface library repository 322.

Indirections generated by application programming interface consumer device 302, via compiler 310 for example, are collected and transmitted by application programming interface consumer device 302, via compiler 310 for example, to a central repository such as application programming interface indirections repository 318, which is accessible by application programming interface consumer device 302 and application programming interface provider device 304. In addition to information regarding the target feature and indirections, application programming interface consumer device 302, via compiler 310 for example, also transmits to the central repository information regarding the particular version of the application programming interface library and an identifier that uniquely identifies the appropriate application programming interface consumer device. The unique identifier ensures that the same information is not transmitted multiple times. Further, identifiers allow rank ordering. The identifier may, for example, be a globally unique identifier (GUID) that is assigned by the integrated development environment of application programming interface consumer device 302. In one illustrative embodiment, identifiers may, for example, be generated when the application programming interface library is downloaded by a consumer device or used for the first time by a consumer device.

When an application programming interface provider developer accesses a target feature from application programming interface provider integrated development environment 320 that is a target of one or more indirections, application programming interface provider integrated development environment 320 uses application programming interface indirections repository 318 to generate a list of the indirections. In one exemplary embodiment, the list can be rank-ordered. While different ordering schemes may be used, the preferred illustrative embodiment applies a usage-based rank ordering.

For example, consider the method 'boolean getBoolean (String name)', which is an example application programming interface feature 316 that can be stored in application programming interface library 308 and can be a target feature of consumer developers. For purposes of illustration, an assumption is made that the following alternate names for the target feature are provided by consumer developers. In this example, assume that 60 out of 100 consumer developers changed the name of the target feature to 'getEnvBoolean'; another 15 out of the 100 consumer developers changed the name to 'getEnvironmentBoolean'; and another 25 out of the 100 consumer developers changed the name to 'is SysPropertyTrue'. It should be noted that the number of consumer developers that did not provide an alternate name for the target feature is not transmitted to application programming interface indirections repository 318. Application programming interface consumer device 302, via compiler 310 for example, generates indirections that map each of the alternate names to the target feature.

When an application programming interface provider developer accesses the target feature within application programming interface provider integrated development environment 320, the indirections generated by application programming interface consumer device 302, via compiler 310 for example, for the target feature are presented to the provider developer in a list. In this example, the indirections are in a rank order of 1) 'getEnvBoolean'; 2) 'is SysPropertyTrue'; and 3) 'getEnvironmentBoolean' according to frequency of use by the consumer developers. In an alternative illustrative embodiment, this information may also be maintained in application programming interface provider integrated development environment 320 to allow the provider developer to gauge more accurately the need to change a target feature name.

When the application programming interface provider developer modifies a feature that is a target of one or more indirections, compiler 324 within application programming interface provider device 304 captures the change within change log 326. In addition, when the consumer developer performs a version update of application programming interface library 308 on application programming interface consumer device 302, compiler 310 uses change log 314 to automatically update any indirections. It should be noted that this indirection update may not always be possible, especially if the target feature has been modified to include new parameters. In such cases, compiler 310 flags an update error for the indirections.

Another aspect of illustrative embodiments enables provider developers to negotiate the naming of features within the application programming interface being developed. Illustrative embodiments utilize application programming interface provider integrated development environment 320 to enable such community collaboration. By employing existing collaboration technology, such as email or instant messaging, a first developer may initiate a negotiation with a second developer over the naming and/or any other characteristic of a feature within an application programming interface. The negotiation may continue back and forth until a consensus is reached. Additionally, a third developer when viewing their respective copy of an application programming interface integrated development environment, may see that a feature is flagged indicating that a negotiation is underway regarding that particular feature. Further, the third developer may join in the negotiation session.

It should be noted that while the text above appears to only be applicable to "compiled" languages, illustrative embodiments may be applied equally to non-compiled languages, such as, for example, an interpreted language, where an integrated development environment is used for software development and may provide the services described above. The services may be utilized during some intermediate step, such as, for example, build, byte code generation, or a code syntax check process, to realize different illustrative embodiments.

Figure 4:
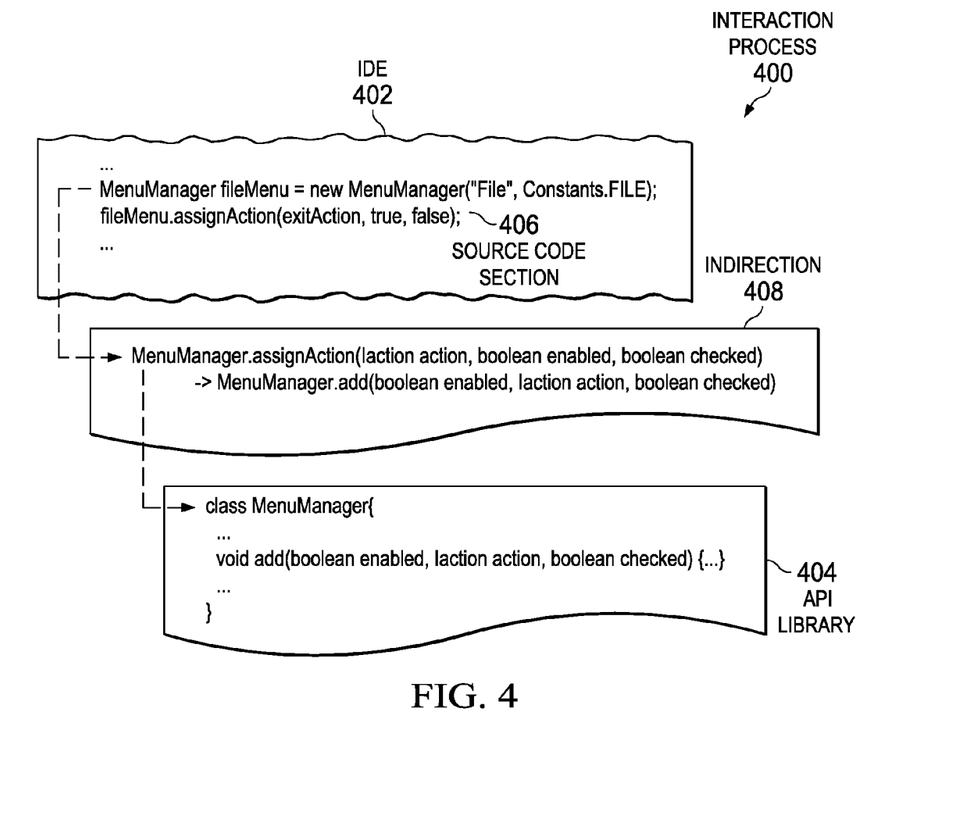
FIG. 4 is a diagram of an indirection process in accordance with an illustrative embodiment.

With reference now to FIG. 4, a diagram of an indirection process is depicted in accordance with an illustrative embodiment. Indirection process 400 may, for example, be implemented in an application programming interface consumer device, such as application programming interface consumer device 302 in FIG. 3.

In this example, assume an application programming interface consumer developer is editing source code, such as consumer developer code 306 in FIG. 3, within integrated development environment 402. In this example, the consumer developer code references the class 'MenuManager' feature within application programming interface library 404. In particular, a consumer developer initially desires that section of consumer developer code within integrated development environment 402, such as source code section 406, reference the method 'add', which requires the following three input parameters in this order: 1) a Boolean variable called 'enabled'; 2) a class variable called 'action' of type 'IAction'; and 3) a Boolean variable called 'checked'.

Ultimately, the consumer developer determines that the method name and the parameter order are not appropriate for the consumer developer's use. As a result, the consumer developer determines that the following changes should be made in the consumer developer's invocation of this particular method: 1) the method should be renamed 'assignAction'; and 2) the order of the three input parameters listed above should be changed. When the consumer developer makes these changes within source code section 406, which changes are shown in FIG. 4, a compiler, such as compiler 310 in FIG. 3, automatically generates indirection 408 that maps source code section 406 to the target method feature in application programming interface library 404.

Syntax trees, and in particular abstract syntax trees, are commonly used to represent the syntax of source code. In different illustrative embodiments where abstract syntax trees are used to represent the consumer developer code in integrated development environment 402 and application programming interface library 404, indirection 408 will contain tree node mappings from alternate feature names to target feature names.

Figure 5:
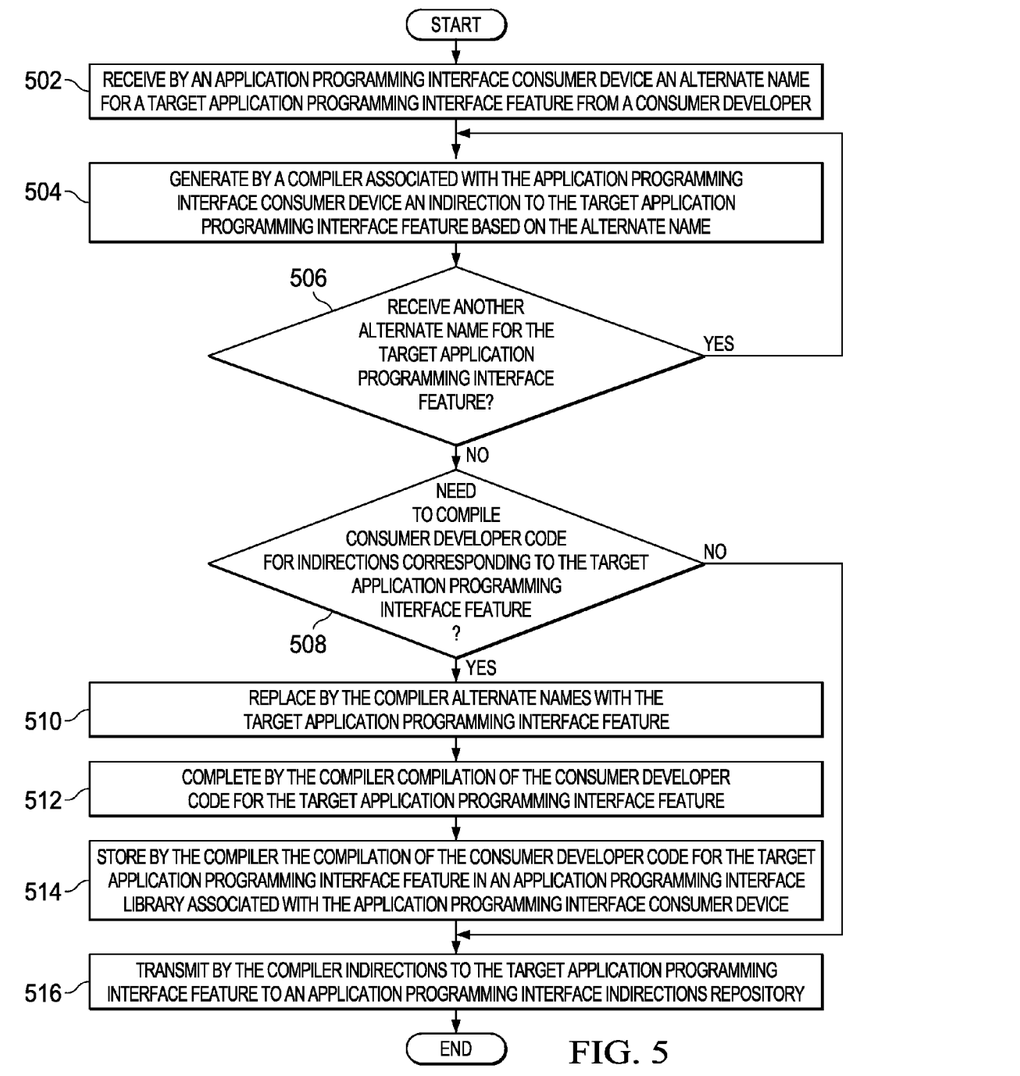
FIG. 5 is a flowchart illustrating a process for providing an alternate application programming interface feature name by a consumer device in accordance with an illustrative embodiment.

With reference now to FIG. 5, a flowchart illustrating a process for providing an alternate application programming interface feature name by a consumer device is shown in accordance with an illustrative embodiment. The process shown in FIG. 5 may be implemented in an application programming interface consumer device, such as application programming interface consumer device 302 in FIG. 3.

The process begins when the application programming interface consumer device receives an alternate name for a target application programming interface feature from a consumer developer (block 502). In response to the application programming interface consumer device receiving the alternate name for the target application programming interface feature in block 502, a compiler associated with the application programming interface consumer device, such as compiler 310 in FIG. 3, automatically generates an indirection to the target application programming interface feature based on the alternate name (block 504).

In response to the compiler automatically generating the indirection to the target application programming interface feature based on the alternate name in block 504, the application programming interface consumer device makes a determination as to whether the application programming interface consumer device received another alternate name for the target application programming interface feature (block 506). If the application programming interface consumer device determines that another alternate name for the target application programming interface feature was received, yes output of block 506, then the process returns to block 504 where the compiler automatically generates another indirection to the target application programming interface feature based on the additional alternate name. If the application programming interface consumer device determines that another alternate name for the target application programming interface feature was not received, no output of block 506, then the application programming interface consumer device makes a determination as to whether the compiler needs to compile consumer developer code for indirections corresponding to the target application programming interface feature (block 508).

If the application programming interface consumer device determines that the compiler does not need to compile consumer developer code for indirections corresponding to the target application programming interface feature, no output of block 508, then the process proceeds to block 516. If the application programming interface consumer device determines that the compiler does need to compile consumer developer code for indirections corresponding to the target application programming interface feature, yes output of block 508, then the compiler replaces alternate names with the target application programming interface feature (block 510).

In response to the compiler replacing the alternate names with the target application programming interface feature in block 510, the compiler completes compilation of the consumer developer code for the target application programming interface feature (block 512). In response to the compiler completing compilation of the consumer developer code for the target application programming interface feature in block 512, the compiler stores the compilation of the consumer developer code for the target application programming interface feature in an application programming interface library associated with the application programming interface consumer device (block 514). In addition, the compiler transmits indirections for the target application programming interface feature to an application programming interface indirections repository, such as application programming interface indirections repository 318 in FIG. 3 (block 516). The process terminates thereafter.

Figure 6:
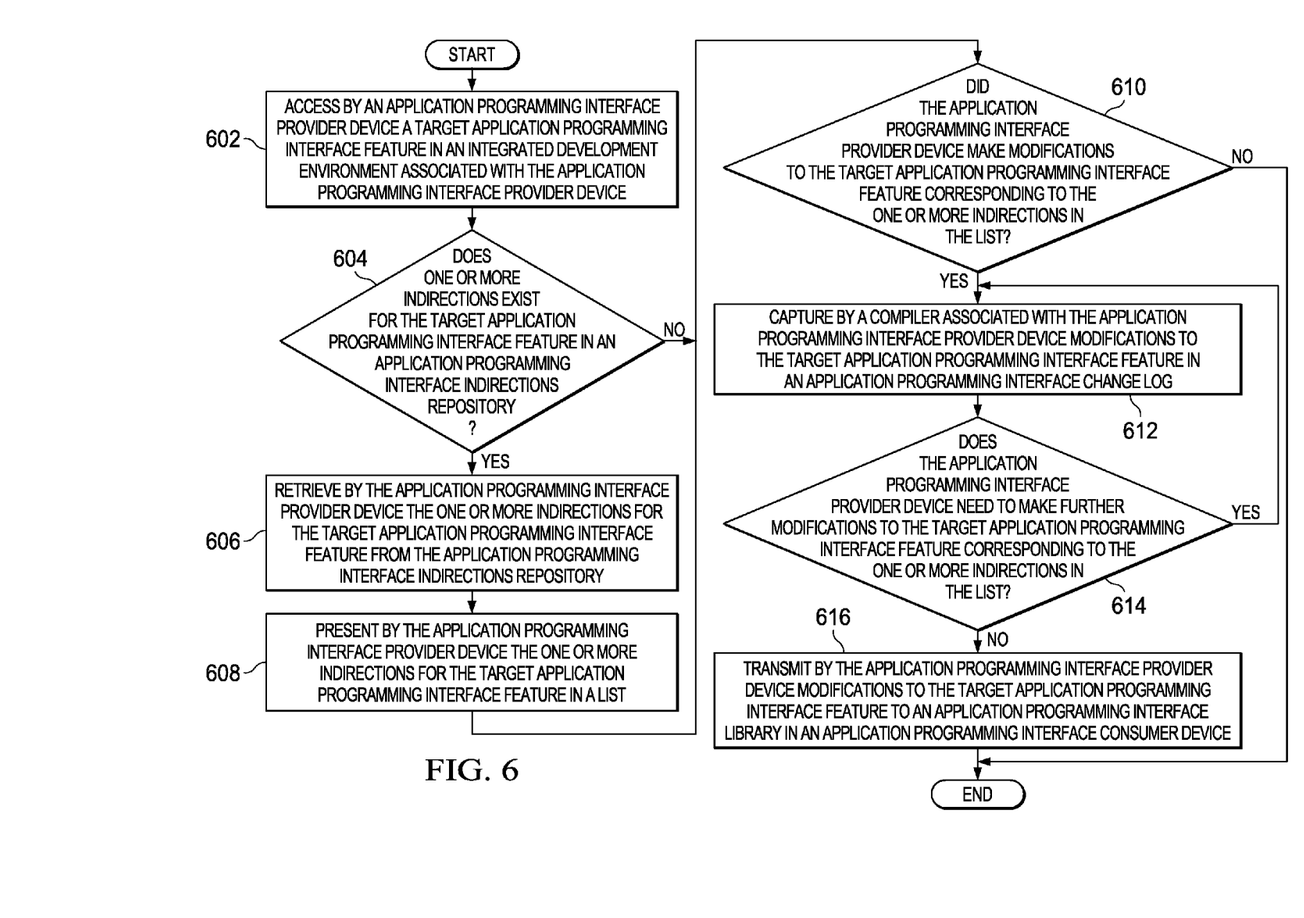
FIG. 6 is a flowchart illustrating a process for accessing an application programming interface feature by a provider device in accordance with an illustrative embodiment.

With reference now to FIG. 6, a flowchart illustrating a process for accessing an application programming interface feature by a provider device is shown in accordance with an illustrative embodiment. The process shown in FIG. 6 may be implemented in an application programming interface provider device, such as application programming interface provider device 304 in FIG. 3.

The process begins when the application programming interface provider device via an application programming interface provider integrated development environment, such as application programming interface provider integrated development environment 320 in FIG. 3, accesses a target application programming interface feature in an integrated development environment associated with the application programming interface provider device (block 602). In response to the application programming interface provider device accessing the target application programming interface feature in the integrated development environment associated with the application programming interface provider device in block 602, the application programming interface provider device makes a determination as to whether one or more indirections exist for the target application programming interface feature in an application programming interface indirections repository, such as application programming interface indirections repository 318 in FIG. 3 (block 604). If the application programming interface provider device determines that one or more indirections do not exist for the target application programming interface feature in an application programming interface indirections repository, no output of block 604, then the process proceeds to block 610. If the application programming interface provider device determines that one or more indirections do exist for the target application programming interface feature in an application programming interface indirections repository, yes output of block 604, then the application programming interface provider device retrieves the one or more indirections for the target application programming interface feature from the application programming interface indirections repository (block 606).

In response to retrieving the one or more indirections for the target application programming interface feature from the application programming interface indirections repository in block 606, the application programming interface provider device presents the one or more indirections for the target application programming interface feature in a list that, in one exemplary embodiment, can be a rank-ordered list (block 608). In response to the application programming interface provider device presenting the one or more indirections for the target application programming interface feature in the list in block 608, the application programming interface provider device makes a determination as to whether the application programming interface provider device made modifications to the target application programming interface feature corresponding to the one or more indirections in the list (block 610). If the application programming interface provider device did not make modifications to the target application programming interface feature corresponding to the one or more indirections in the list, no output of block 610, then the process terminates thereafter.

If the application programming interface provider device did make modifications to the target application programming interface feature corresponding to the one or more indirections in the list, yes output of block 610, then a compiler associated with the application programming interface provider device, such as compiler 324 in FIG. 3, captures the modifications to the target application programming interface feature in an application programming interface change log (block 612). In response to the compiler capturing the modifications to the target application programming interface feature in the application programming interface change log in block 612, the application programming interface provider device makes a determination as to whether the application programming interface provider device needs to make further modifications to the target application programming interface feature corresponding to the one or more indirections in the list (block 614). If the application programming interface provider device does make further modifications to the target application programming interface feature corresponding to the one or more indirections in the list, yes output of block 614, then the process returns to block 612 where the compiler captures the further modifications to the target application programming interface feature in the change log. If the application programming interface provider device does not make further modifications to the target application programming interface feature corresponding to the one or more indirections in the list, no output of block 614, then the application programming interface provider device transmits the modifications to the target application programming interface feature to an application programming interface library in an application programming interface consumer device, such as application programming interface library 308 in FIG. 3 (block 616). The process terminates thereafter.

Figure 7:
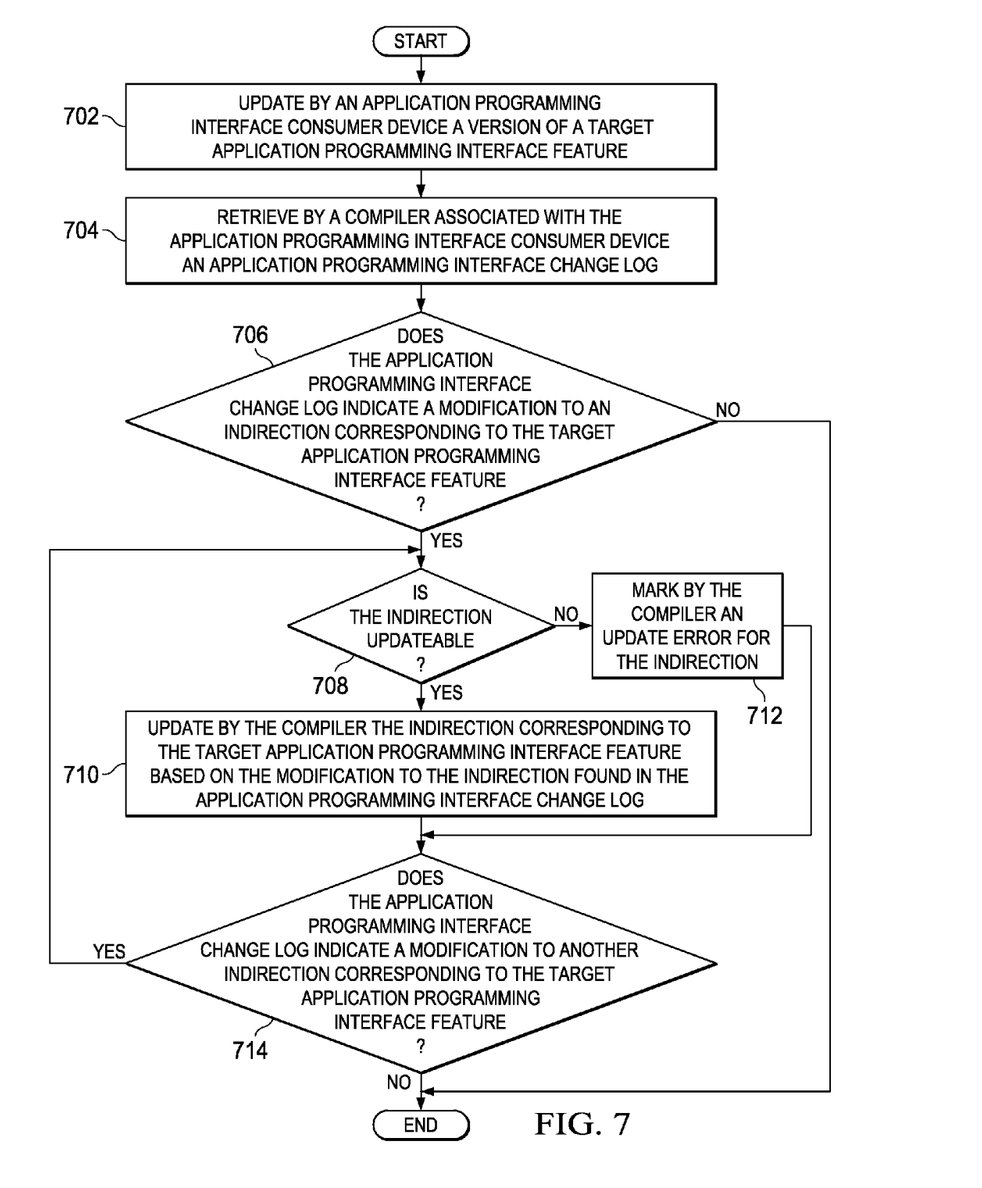
FIG. 7 is a flowchart illustrating a process for updating an application programming interface version by a consumer device in accordance with an illustrative embodiment.

With reference now to FIG. 7, a flowchart illustrating a process for updating an application programming interface version by a consumer device is shown in accordance with an illustrative embodiment. The process shown in FIG. 7 may be implemented in an application programming interface consumer device, such as application programming interface consumer device 302 in FIG. 3.

The process begins when the application programming interface consumer device updates a version of a target application programming interface feature (block 702). The consumer developer may, for example, download and install the update or the application programming interface consumer device may include an automatic update feature. In response to the application programming interface consumer device updating the version of the target application programming interface feature in block 702, a compiler associated with the application programming interface consumer device, such as compiler 310 in FIG. 3, retrieves an application programming interface change log, such as application programming interface change log 314 in FIG. 3 (block 704). In response to the compiler retrieving the application programming interface change log in block 704, the compiler makes a determination as to whether the application programming interface change log indicates a modification to an indirection corresponding to the target application programming interface feature (block 706). If the compiler determines that the application programming interface change log does not indicate a modification to an indirection corresponding to the target application programming interface feature, no output of block 706, then the process terminates thereafter.

If the compiler determines that the application programming interface change log does indicate a modification to an indirection corresponding to the target application programming interface feature, yes output of block 706, then the compiler makes a determination as to whether the indirection corresponding to the target application programming interface is updateable (block 708). The compiler may, for example, determine that the indirection is not updateable because a different compiler originally generated this particular indirection, a different utility generated this particular indirection, or the name of the application programming interface feature associated with the indirection changed and the compiler is not able to determine the name change. If the compiler determines that the indirection corresponding to the target application programming interface is updateable, yes output of block 708, then the compiler updates the indirection corresponding to the target application programming interface feature based on the modification to the indirection found in the application programming interface change log (block 710). In response to the compiler updating the indirection corresponding to the target application programming interface feature based on the modification to the indirection found in the application programming interface change log in block 710, the process proceeds to block 714.

If the compiler determines that the indirection corresponding to the target application programming interface is not updateable, no output of block 708, then the compiler marks an update error for the indirection (block 712). In response to the compiler marking the update error for the indirection in block 712, the compiler makes a determination as to whether the application programming interface change log indicates a modification to another indirection corresponding to the target application programming interface feature (block 714). If the compiler determines that the application programming interface change log does indicate a modification to another indirection corresponding to the target application programming interface feature, yes output of block 714, then the process returns to block 708 where the compiler makes a determination as to whether the indirection is updateable. If the compiler determines that the application programming interface change log does not indicate a modification to another indirection corresponding to the target application programming interface feature, no output of block 714, then the process terminates thereafter.

Thus, illustrative embodiments of the present invention provide a method, computer system, and computer program product for improving application programming interface naming using collaborative services between application programming interface provider developers and consumer developers. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for improving names of methods or classes of a target application programming interface, the method, performed on an application programming interface consumer computer, comprising the steps of:

receiving a copy of the target application programming interface from another computer, wherein the target application programming interface has an original name to one of the methods or classes;

receiving an alternate name for a the original name of one of the methods or classes of the target application programming interface;

generating, by a compiler, an indirection to the one method or class of the target application programming interface based on the alternate name, wherein the indirection points from the alternate name created by an application programming interface consumer for the one method or class of the target application programming interface to the original name created by an application programming interface provider for the one method or class of the target application programming interface;

replacing, by the compiler, the original name with the alternate name for the one method or class of the target application programming interface, and in response, the compiler completing compilation of code for the one method or class of the target application programming interface;

after completing the compilation, determining whether an application programming interface change log indicates a modification to the indirection corresponding to the one method or class of the target application programming interface;

responsive to a determination that the application programming interface change log indicates a modification to the indirection corresponding to the one method or class of the target application programming interface, updating the indirection; and transmitting, via a network, the indirection to the one method or class of the application programming interface to an indirections repository located in the another computer that stores indirections generated by other computers for current methods or classes associated with local application programming interface libraries.

2. The method of claim 1 further comprising:
compiling, by the compiler, code for the indirection corresponding to the one method or class of the target application programming interface.

3. The method of claim 1 further comprising:
receiving a plurality of alternate names for the one method or class of the target application programming interface; and
generating, by the compiler, a different indirection for each of the plurality of alternate names for the one method or class of the target application programming interface.

4. The method of claim 1 wherein determining whether the application programming interface change log indicates a modification to the indirection further comprises:
determining whether the indirection is updateable.

5. The method of claim 4 further comprising:
responsive to a determination that the indirection is updateable, updating the indirection corresponding to the one method or class of the target application programming interface based on the modification to the indirection found in the application programming interface change log.

6. The method of claim 4 further comprising:
responsive to a determination that the indirection is not updateable, marking an update error for the indirection.

7. The method of claim 1 wherein the indirections repository stores one or more indirections generated by one or more application programming interface consumer computers, and wherein the indirections repository is accessible by both providers and consumers of methods or classes of application programming interfaces.

8. A computer system for improving names of methods or classes of a target application programming interface, the computer system comprising:
one or more processors, one or more computer-readable memories, and one or more computer-readable storage devices and program instructions, stored on the one or more storage devices for execution by the one or more processors via the one or more memories, the program instructions comprising:
program instructions to receive a copy of the target application programming interface from another computer, wherein the target application programming interface has an original name to one of the methods or classes;
program instructions to receive an alternate name for the original name of one of the methods or classes of the target application programming interface;
program instructions to generate, by a compiler, an indirection to the one method or class of the target application programming interface based on the alternate name, wherein the indirection points from the alternate name created by an application programming interface consumer for the one method or class of the target application programming interface to the original name created by an application programming interface provider for the one method or class of the target application programming interface;

program instructions to replace, by the compiler, the original name with the alternate name for the one method or class of the target application programming interface, and in response, the compiler completes compilation of code for the one method or class of the target application programming interface;

program instructions, after completing the compilation, to determine whether an application programming interface change log indicates a modification to the indirection corresponding to the one method or class of the target application programming interface;

program instructions, responsive to a determination that the application programming interface change log indicates a modification to the indirection corresponding to the one method or class of the target application programming interface, to update the indirection; and program instructions to transmit, via a network, the indirection to the one method or class of the target application programming interface to an indirections repository located in the another computer that stores indirections generated by other computers for current methods or classes associated with local application programming interface libraries.

9. The computer system of claim 8 further comprising:
program instructions to compile code for the indirection corresponding to the one method or class of the target application programming interface.

10. The computer system of claim 8 further comprising:
program instructions to receive a plurality of alternate names for the one method or class of the target application programming interface; and
program instructions to generate a different indirection for each of the plurality of alternate names for the one method or class of the target application programming interface.

11. A computer program product for improving names of methods or classes of a target application programming interface, the computer program product comprising:
one or more computer-readable storage devices and program instructions, stored on the one or more computer-readable storage devices, the program instructions comprising:
program instructions to receive a copy of the target application programming interface from another computer, wherein the target application programming interface has an original name to one of the methods or classes;
program instructions to receive an alternate name for the original name of one of the methods or classes of the target application programming interface;
program instructions to generate, by a compiler, an indirection to the one method or class of the target application programming interface based on the alternate name, wherein the indirection points from the alternate name created by an application programming interface consumer for the one method or class of the target application programming interface to the original name created by an application programming interface provider for the one method or class of the target application programming interface;
program instructions to replace, by the compiler, the original name with the alternate name for the one method or class of the target application programming interface, and in response, the compiler completes compilation of code for the one method or class of the target application programming interface;

program instructions, after completing the compilation, to determine whether an application programming interface change log indicates a modification to the indirection corresponding to the one method or class of the target application programming interface;

program instructions, responsive to a determination that the application programming interface change log indicates a modification to the indirection corresponding to the one method or class of the target application programming interface, to update the indirection; and program instructions to transmit, via a network, the indirection to the one method or class of the target application programming interface to an indirections repository located in the another computer that stores indirections generated by other computers for current methods or classes associated with local application programming interface libraries.

12. The computer program product of claim 11 further comprising:

program instructions to compile code for the indirection corresponding to the one method or class of the target application programming interface.

13. The computer program product of claim 11 further comprising:

program instructions to receive a plurality of alternate names for the one method or class of the target application programming interface; and program instructions to generate a different indirection for each of the plurality of alternate names for the one method or class of the target application programming interface.

14. The computer program product of claim 11 wherein program instructions to determine whether the application programming interface change log indicates a modification to the indirection further comprises:

program instructions to determine whether the indirection is updateable.

* * * * *